US012187326B2

(12) United States Patent
Gao

(10) Patent No.: US 12,187,326 B2
(45) Date of Patent: Jan. 7, 2025

(54) CONTROL SYSTEM FOR SEMI-AUTONOMOUS CONTROL OF VEHICLE ALONG LEARNED ROUTE

(71) Applicant: MAGNA ELECTRONICS INC., Auburn Hills, MI (US)

(72) Inventor: Wenxue Gao, Waldaschaff (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 467 days.

(21) Appl. No.: 16/947,184

(22) Filed: Jul. 22, 2020

(65) Prior Publication Data

US 2020/0348667 A1   Nov. 5, 2020

Related U.S. Application Data

(63) Continuation of application No. 15/596,348, filed on May 16, 2017, now abandoned.

(60) Provisional application No. 62/336,883, filed on May 16, 2016.

(51) Int. Cl.
*B60W 60/00* (2020.01)
*B60W 30/10* (2006.01)
*B60W 50/00* (2006.01)
*B60W 50/08* (2020.01)
*B60W 50/14* (2020.01)

(52) U.S. Cl.
CPC ........ *B60W 60/0059* (2020.02); *B60W 30/10* (2013.01); *B60W 50/0098* (2013.01); *B60W 50/082* (2013.01); *B60W 50/14* (2013.01); *B60W 60/0053* (2020.02); *B60W 60/0061* (2020.02); *B60W 2050/0075* (2013.01); *B60W 2050/0088* (2013.01); *B60W 2050/143* (2013.01); *B60W 2420/403* (2013.01); *B60W 2420/408* (2024.01); *B60W 2540/26* (2013.01); *B60W 2554/4029* (2020.02); *B60W 2555/20* (2020.02); *B60W 2556/10* (2020.02)

(58) Field of Classification Search
None
See application file for complete search history.

(56) References Cited

U.S. PATENT DOCUMENTS

| | | | |
|---|---|---|---|
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,268 B2 | 2/2004 | Schofield et al. | |

(Continued)

*Primary Examiner* — Jelani A Smith
*Assistant Examiner* — Toya Pettiegrew
(74) *Attorney, Agent, or Firm* — HONIGMAN LLP

(57) ABSTRACT

A vehicular control system for controlling a vehicle includes a vehicle control, an acceleration sensor and a camera. The vehicle control includes an image processor for processing image data captured by the camera as the vehicle is driven along a route by a driver of the vehicle. The vehicle control detects traffic and road topography and determines acceleration of the vehicle as the vehicle is driven along the route by the driver. The vehicle control learns the route during multiple repetitive drives of the route by the driver of the vehicle. The vehicle control increases a confidence level of the learned route during multiple repetitive drives of the route by the vehicle. When the confidence level exceeds a threshold value, the vehicle control is operable to at least semi-autonomously control the vehicle to drive the vehicle along the route.

23 Claims, 3 Drawing Sheets

(56) References Cited

U.S. PATENT DOCUMENTS

| | | | |
|---|---|---|---|
| 6,690,354 B2 | 2/2004 | Sze | |
| 6,693,517 B2 | 2/2004 | McCarthy et al. | |
| 6,710,770 B2 | 3/2004 | Tomasi et al. | |
| 6,906,793 B2 | 6/2005 | Bamji et al. | |
| 6,919,549 B2 | 7/2005 | Bamji et al. | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,580,795 B2 | 8/2009 | McCarthy et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,146,898 B2 | 9/2015 | Ihlenburg et al. | |
| 2010/0148948 A1* | 6/2010 | Murphy | B60W 30/12 340/439 |
| 2010/0152967 A1* | 6/2010 | Murphy | B60W 40/06 701/300 |
| 2010/0245066 A1 | 9/2010 | Sarioglu et al. | |
| 2012/0062743 A1 | 3/2012 | Lynam et al. | |
| 2012/0218412 A1 | 8/2012 | Dellantoni et al. | |
| 2013/0222592 A1 | 8/2013 | Gieseke | |
| 2014/0067206 A1 | 3/2014 | Pflug | |
| 2014/0156134 A1 | 6/2014 | Cullinane et al. | |
| 2014/0218529 A1 | 8/2014 | Mahmoud et al. | |
| 2014/0375476 A1 | 12/2014 | Johnson et al. | |
| 2015/0073620 A1 | 3/2015 | Matsumura | |
| 2015/0124096 A1 | 5/2015 | Koravadi | |
| 2015/0158499 A1 | 6/2015 | Koravadi | |
| 2015/0168157 A1* | 6/2015 | Hoch | B60W 40/107 701/400 |
| 2015/0251599 A1 | 9/2015 | Koravadi | |
| 2015/0344028 A1 | 12/2015 | Gieseke et al. | |
| 2015/0352953 A1 | 12/2015 | Koravadi | |
| 2016/0036917 A1 | 2/2016 | Koravadi et al. | |
| 2016/0210853 A1 | 7/2016 | Koravadi | |
| 2017/0008522 A1* | 1/2017 | Sato | B60W 10/04 |
| 2017/0052028 A1 | 2/2017 | Choudhury et al. | |
| 2017/0135621 A1* | 5/2017 | Lee | A61B 5/18 |
| 2017/0197635 A1 | 7/2017 | Sato | |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0329331 A1 | 11/2017 | Gao | |
| 2017/0356994 A1 | 12/2017 | Wodrich et al. | |
| 2017/0371334 A1* | 12/2017 | Nagy | B60K 35/00 |
| 2018/0015875 A1 | 1/2018 | May et al. | |
| 2018/0045812 A1 | 2/2018 | Hess | |
| 2018/0088574 A1 | 3/2018 | Latotzki et al. | |
| 2018/0178766 A1* | 6/2018 | Oba | B60W 60/00253 |
| 2022/0373338 A1* | 11/2022 | Al-Dahle | G05D 1/0276 |

* cited by examiner

CONTROL SYSTEM FOR SEMI-AUTONOMOUS CONTROL OF VEHICLE ALONG LEARNED ROUTE

CROSS REFERENCE TO RELATED APPLICATIONS

The present application is a continuation of U.S. patent application Ser. No. 15/596,348, filed May 16, 2017, which claims the filing benefits of U.S. provisional application Ser. No. 62/336,883, filed May 16, 2016, which is hereby incorporated herein by reference in its entirety.

FIELD OF THE INVENTION

The present invention relates generally to a vehicle control system and, more particularly, to a vehicle control system for autonomously or semi-autonomously driving a vehicle along a road.

BACKGROUND OF THE INVENTION

Driver assist systems are known where a system can autonomously or semi-autonomously control a vehicle during certain driving tasks, such as highway driving and/or parking maneuvers. Such systems may be responsive to processing of image data captured by one or more cameras of the vehicle and/or processing of other sensor data captured by one or more other sensors of the vehicle.

SUMMARY OF THE INVENTION

The present invention provides a vehicle control system that controls the vehicle to drive the vehicle along a road. The system learns the road during initial driving passes along the road and, after sufficiently learning the road or path of travel typically taken by the vehicle (such as by learning road lane features, road curvature features and/or road contour features of a route driven by the vehicle during multiple repetitive drives of the route by the vehicle to learn the route), the system can autonomously or semi-autonomously control the vehicle along the road or path. The system learns the road during multiple drives by the driver of the road or path or route (such as when the driver drives from home to work and/or from work to home) and, after multiple learning passes (where the system "learns" the road, the route, and/or typical driving speeds and traffic conditions), the system can autonomously or semi-autonomously control the vehicle (such as when a driver selects a semi-autonomous driving function) along the route. The driver can at any time (such as when desired or when the vehicle approaches the end of its learned route) take over control of the vehicle and override the semi-autonomous control of the vehicle by the control system of the present invention. Thus, the control system of the present invention provides a user selected semi-autonomous control of the vehicle to allow the driver to rest or be less active in driving the vehicle during routine, often repeated trips, such as to and from work and the like.

These and other objects, advantages, purposes and features of the present invention will become apparent upon review of the following specification in conjunction with the drawings.

DESCRIPTION OF THE PREFERRED EMBODIMENTS

A vehicle control system or vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
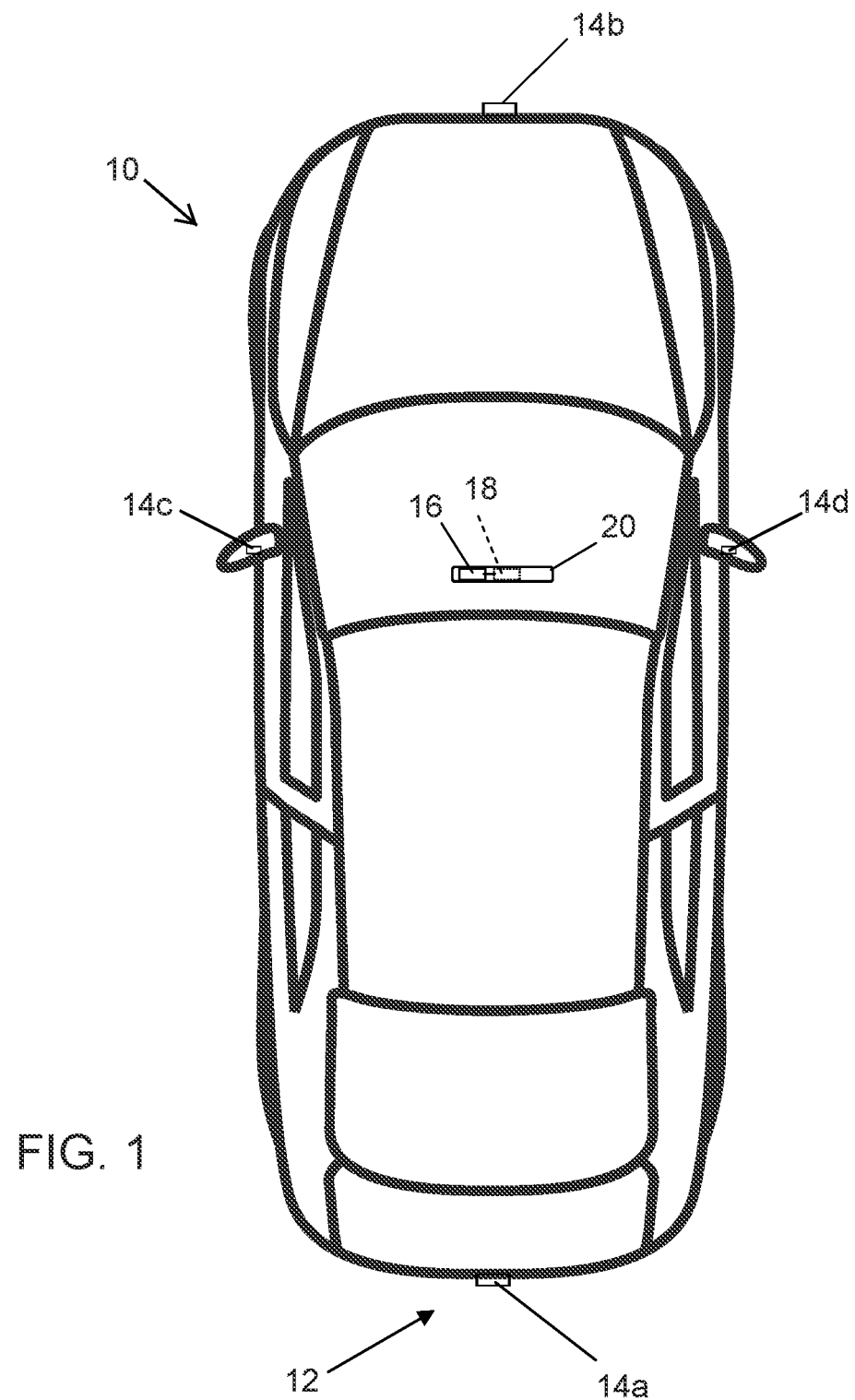
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Many (maybe over 30 percent) vehicle driving situations are repeating routes, such as, for example, from home to office, from home to school, or from home to supermarkets, and vice versa. With the boom of artificial intelligence (AI), such as deep learning AI algorithms or the like, the driving of such routes in drive autonomously may come into reach. This may be an extended functionality of a highway chauffeur. Highway chauffeurs are able to master a limited set of driving tasks in a defined (highway) environment and situational response tasks. When driving in cities and overland routes, the environment is less defined, and by that there is the possibility of opposing traffic, cross traffic, slow traffic participants (such as, for example, horse carriages, fork lifter, tractors and rollerblader, skateboarder, cyclists) and 'irresponsible' road users such as children. Additionally, the roads may be narrower and the routes may have turning points on roundabouts, U-turns and intersections.

For enabling a semi-autonomous vehicle to drive consecutively driven routes, such as the typical way from a driver's home to work, the semi-autonomous vehicle may employ an artificial intelligence capable of learning the typical path and its scenery. This may be done under use of a neural network (NN) learning algorithm, such as by a Deep Neural Network (DNN) or a different suitable network or algorithm derivate such as, for example, CNN (Convolutional Neural Network) or SVM (Support Vector Machine) having sufficient processing and storage resources within the semi-autonomous vehicle. In contrast to conventional autonomous driving approaches using artificial learning procedures and data which typically aim to generalize the learned, for being able to master all upcoming situations, which are only partially plannable or foreseeable, the system of the present invention aims for driving autonomously, specially trained for known (planned and foreseeable) routes under good weather conditions. Since it is intended to fulfil SAE Level 3, unforeseen events and driving tasks may be left to the human driver. The system's limitations are compensated by the other advantages the system has. The system is able to generate a high level of autonomy or autonomous control, while the sensor requirements and training efforts are comparably low and inexpensive. By the system's nature it may imitate the human driver in terms of speed control and curve turning. In this way, the critical issues in common with autonomous driving development, such as distant curve radius detection and/or speed limit sign recognition, can be ignored.

Therefore, the system is a special implementation of autonomous driving systems. During the NN learning phase, the vehicle may collect data of the GPS positions, speed, selected gear, (position and traffic situational depending), acceleration areas (position and traffic situational depending) and areas where typical braking takes place (position and traffic situational depending), traffic signs and signals position and the road topography. The semi-autonomous vehicle may optionally include cameras, LIDAR sensors, RADAR sensors, ultrasound sensors and/or inert sensor systems as environment detection sensors and according data processing systems (especially for fusion and scene understanding). The NN may take the vehicle's stability sensor information into account such as rotatory (Gyro) and accelerator sensors, wheel speed sensors, gear, clutch condition, ASR, ABS, ESC interaction and the like.

The learning or training may cover street driving and optionally as well as the parking-out and parking-in maneuvers at the start and the beginning of the route. Optionally, there may be a training set for several route variants when there is more than one way from one repeatedly driven destination to the other. The system may filter 'free ride' (with no vehicles in front of the subject vehicle such that driving actions may have influence to the human driver's driving) from 'interfered driving' (which includes situations where interference with pedestrians or other moving objects around the vehicle or vehicles in front, rear, other lanes and opposing traffic may take place). As known the data collection in NN or SVM is a matter of strengthening weighting structures or weighted vectors. Optionally, the learning may have a higher weighting on way sections where 'free ride' was possible since the learning is aiming to a best manner of achieving the driving task at a specific way point. Interference, such as braking maneuvers that may, for example, be induced due to a slow driving vehicles in front on a curvy lane road may derail the system's learning experience of how to master these curves when having the task to autonomously drive through that curves when no slow vehicle slows down the ride. Due to that 'no free ride' sections may be fully ignored or weighted low during the learning procedure.

The learning may be a patchwork of free ride sections which were repeatedly driven, so that the DNN was able to learn their characteristics. The more often a way section was learned the higher the confidence level may grow for that section. This method provides reinforcement learning. The system may predict the near future (time wise) or near path (way wise) time segment or way segment (a segment may have 2.5 meters or a quarter second) ahead of it and may rate a segment later how strong the prediction of the human driven segment complied with the prediction, which result than reinforces the data set for that single segment. When a certain minimal confidence level is exceeded (e.g., around 95 percent) on all segments of a route or partial section of a route, the route or section (called a 'confident section') of the route will be released (highlighted as a "green route") to be driven in semi-autonomous driving mode to the driver on the driver's choice to engage or disengage and take over by himself or herself whenever he/she likes and is anywhere on that trained route or section. When a confident section ends the semi-autonomous driving mode may signal the driver to take over within a certain taking over time (such as, for example, three seconds or thereabouts). The hand over and the hand over time determination as well as the triggering of emergency vehicle handling when the driver does not take over is described in U.S. provisional application, Ser. No. 62/401,310, filed Sep. 29, 2016, which is hereby incorporated herein by reference in its entirety.

Figure 2:
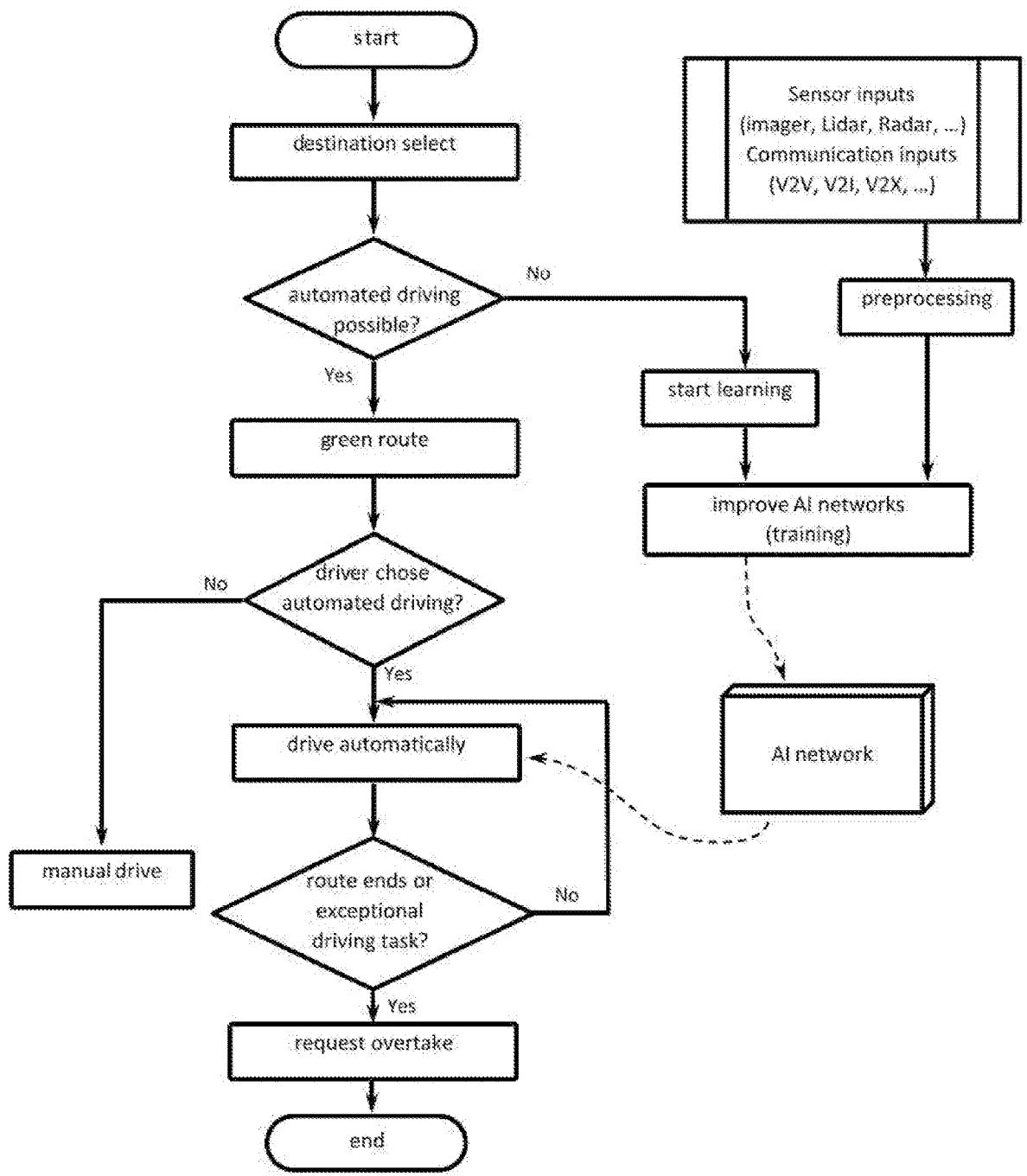
FIG. 2 shows a flow chart of the learning and driving execution of a system according the invention.

FIG. 2 shows a flow chart of the learning and driving execution of a system according to the invention, including the sensors. Optionally (not shown in the flow chart of FIG. 2), the learning may also take place when the vehicle is driving autonomously by testing minimal driving deviations in the lateral guidance and lateral acceleration (and its higher harmonics) and longitudinally by deviating the speed, acceleration and its higher harmonics for improving/optimizing the ride. The optimization may always tend to minimize the accelerations, travel time, fuel consumption and vehicle wear during maximizing the comfort and safety. The optimization may be done by reflecting the drivers driving interference and the driver's mood (assessed by a face detection AI).

Optionally, since the end of a section is known, the taking over may be signaled by a countdown, so that the driver is always aware how much time remains to him for non-driving activities (when legal) or just not driving but supervising the vehicle driving (such as, for example, when this is legally required). Since the system may not learn well to handle situational interactions, such as dealing with opposing traffic on road sections smaller than the vehicles to pass at the same time (or determined deviations from the learned features of the learned route), the system may optionally hand over these challenging tasks to the human driver and may offer to take back when the situation is passed. In general, the system may have the ability to slow down when approaching a detected or determined obstacle (as may be detected via a camera system and/or other sensor system of the vehicle) or a narrow section of road, or slow running traffic in front, such as in a similar manner as may be provided by an advanced or adaptive cruise control (ACC) collision avoidance system or other driver assistance system or anti-collision controls for assisted or autonomous (piloted) highway driving or the like.

Optionally, the system may, responsive to a determination that the driver has not taken over control of the vehicle (such as after a period of time elapses following when an alert to the driver to take over control of the vehicle), function to slow or stop the vehicle. For example, if a pedestrian or deer or other vehicle is determined (such as via processing of image data captured by one or more cameras of the vehicle or processing of sensor data captured by one or more radar or lidar sensors of the vehicle) to be present in the path or route (or approaching the path or route) where the system does not expect such objects, the system may generate an alert to have the driver take over, and if, after, for example, 1 second or 2 seconds, the driver has not started manually driving/controlling the vehicle, the system may slow and/or stop the vehicle. The system may determine various deviations from the determined or learned features of the route, such as determination of the presence of pedestrians or other vehicles or objects, or determination of a change in weather conditions or road conditions or the like. The determination of deviations may be made responsive to processing of data captured by one or more sensors of the vehicle (such as one or more cameras or radar or lidar sensors of the vehicle), or responsive to receipt of a communication from a remote transmitter or communication device, such as a V2V communication (from another vehicle) or V2X communication (from an infrastructure) or the like, or responsive to determination of a change in weather (such as responsive to a GPS system that receives communications indicative of weather conditions local to the vehicle's current geographical location).

Figure 3:
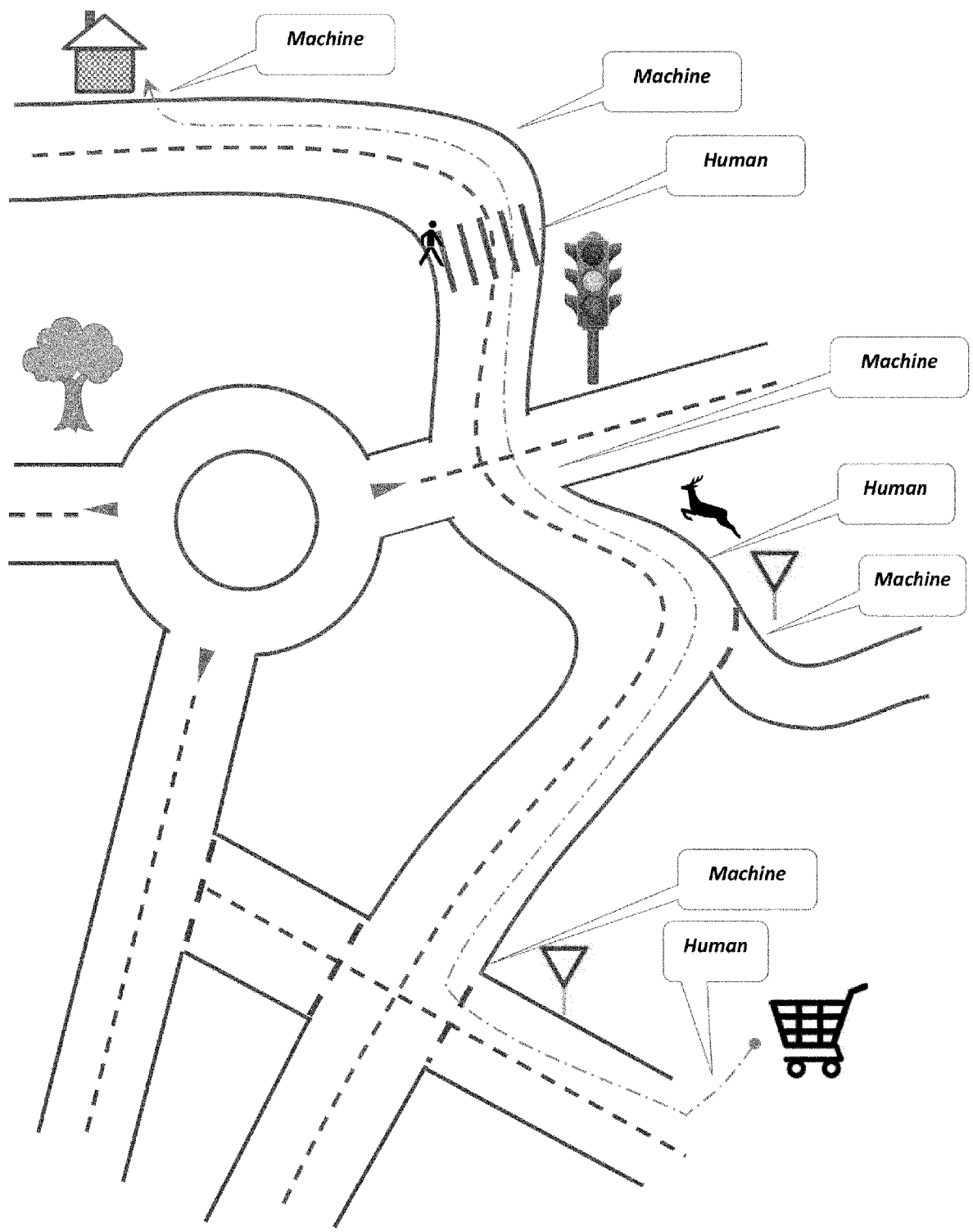
FIG. 3 shows a plan view to a route (dotted line) which may lead along a street way from a shopping area to the driver's home, passing intersections, traffic lights, curves.

FIG. 3 shows a plan view to a green route (dotted line) which leads along a street way from a shopping area to the driver's home, passing intersections, traffic lights and curves. An already trained system according the invention may be capable of handling the driving tasks on the way home from the shopping center autonomously (also called machine driven), with the learned path marked as "Machine", while the system may request a driver take over (manual drive) at route sections with exceptional (unforeseen, uncommon, unsafe) driving tasks (such as when the system determines a deviation from the learned features, such as change in weather or presence of pedestrians or other vehicles or the like) marked as "Human" also when the vehicle is on a green route, see also FIG. 2. For example, FIG. 3 shows a deer close to the street. The deer was not learned as a static property in the data set and is a moving object, and by that the system does a human driver intervention request (request overtake). Another similar example is a pedestrian passing a cross walk which is captured in the data set without humans on it. By that the driver may have passed the cross walk at higher speed as common as when pedestrian close to the cross walk. Because of that, the system, responsive to that information, may request that the driver take over control of the vehicle.

When the exceptional situation diminishes or is passed and the vehicle is still on a green route, the vehicle may offer the driver to continue machine driven. When weather conditions or road conditions occur that are not well trained or learned, such as having the street covered by ice, hail, snow, dust or sand or when the sensors signals diminish too much due to weather influence, the system may also hand over the driving task to the driver.

Optionally, if there are cases that were not covered by the training process, the system may have a set of pre-installed safety functions like emergency braking. The system (when autonomously driving the vehicle along a learned path) may also have a maximum limit of speed, e.g., 130 kph, even on roads where no speed limit applies.

Information may come from vehicle inherent environmental sensors, such as visual cameras, infrared cameras, time of flight sensors, structured light sensors, RADAR, LIDAR, ultrasound sensors or any other kind of ranging sensor, preferably having a long range. For example, the vehicle may have a plurality of cameras and/or RADAR sensors and/or LIDAR sensors and/or ultrasonic sensors and/or the like. The system may utilize sensors, such as radar or lidar sensors or the like. The sensing system may utilize aspects of the systems described in U.S. Pat. Nos. 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. patent application Ser. No. 15/467,247, filed Mar. 23, 2017, now U.S. Pat. No. 10,571,562, Ser. No. 15/446,220, filed Mar. 1, 2017, now published as U.S. Publication No. US-2017-0254873, and/or Ser. No. 15/420,238, filed Jan. 31, 2017, now published as U.S. Publication No. US-2017-0222311, and/or U.S. provisional applications, Ser. No. 62/375,161, filed Aug. 15, 2016, Ser. No. 62/361,586, filed Jul. 13, 2016, Ser. No. 62/359,913, filed Jul. 8, 2016, and/or Ser. No. 62/349,874, filed Jun. 14, 2016, which are hereby incorporated herein by reference in their entireties.

Alternatively, information may come from remote sources, such as from a detected obstacle itself (such as, for example, where the blocking object is a broken down vehicle with remote data transmission capability maintained such as by having an E-Call system in a car) or the information may be transmitted by another vehicle (or more than one vehicle, optionally partitionally sent by different peers (such as by utilizing aspects of the systems described in U.S. Publication No. US-2015-0344028, which is hereby incorporated herein by reference in its entirety) or infrastructure which detects the blockage by its own (inherent) sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The vehicle may include a control system and sensors that senses/determines the presence of other vehicles ahead of or in the side lanes adjacent to the lane in which the subject vehicle is traveling. The sensors may comprise cameras or RADAR or LIDAR or ultrasonic sensors or the like, whereby the system (responsive to processing of sensor data) may know when a path is available, such as when it is safe to change lanes into an adjacent lane.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
 a vehicle control comprising circuitry and associated software, wherein the vehicle control is operable to control driving of a vehicle equipped with the vehicular control system;
 an acceleration sensor disposed at the vehicle;

a camera disposed at an in-cabin side of a windshield of the vehicle and viewing forward of the vehicle through the windshield, the camera capturing image data;

wherein the circuitry of the vehicle control comprises an image processor for processing the image data captured by the camera;

wherein the image data captured by the camera while the vehicle is driven along a route by a driver of the vehicle is processed at the image processor to detect traffic viewed by the camera while the vehicle is driven along the route by the driver of the vehicle;

wherein the image data captured by the camera while the vehicle is driven along the route by the driver of the vehicle is processed at the image processor to detect road topography of a road currently traveled by the vehicle while the vehicle is driven along the route by the driver of the vehicle;

wherein the vehicle control, responsive at least in part to (i) detecting traffic while the vehicle is driven along the route by the driver of the vehicle, (ii) detecting road topography while the vehicle is driven along the route by the driver of the vehicle, and (iii) determining acceleration of the vehicle via the acceleration sensor while the vehicle is driven along the route by the driver of the vehicle, learns the route driven by the driver of the vehicle during multiple repetitive drives of the route by the driver of the vehicle;

wherein the vehicle control, when learning the route driven by the vehicle during multiple repetitive drives of the route by the vehicle, determines whether a driving segment of the route is a free ride driving segment or an interfered driving segment, and wherein the free ride driving segment comprises a driving segment where no vehicles are within a threshold distance in front of the vehicle, and wherein the interfered driving segment comprises a driving segment where another vehicle is within the threshold distance in front of the vehicle;

wherein the vehicle control, when learning the route driven by the vehicle during multiple repetitive drives of the route by the vehicle, assigns a greater learning weight to free ride driving segments relative to interfered driving segments;

wherein, during the multiple repetitive drives of the route by the vehicle to learn the route, a confidence level for the learned route is increased, and wherein the confidence level represents a likelihood the vehicle control is capable of at least semi-autonomously controlling the vehicle along the learned route;

wherein the vehicle control determines that the confidence level of the learned route fails to exceed a threshold value;

wherein, responsive to determining that the confidence level of the learned route fails to exceed the threshold value, the vehicle control disables at least semi-autonomous control of the vehicle along the learned route;

wherein, after the vehicle control disables at least semi-autonomous control of the vehicle along the learned route, the vehicle control determines that the confidence level of the learned route exceeds the threshold value;

wherein, responsive to determining that the confidence level of the learned route exceeds the threshold value, the vehicle control enables at least semi-autonomous control of the vehicle along the learned route; and wherein, responsive at least in part to determining that the vehicle is traveling along the learned route when the at least semi-autonomous control of the vehicle along the learned route is enabled, the vehicle control at least semi-autonomously controls the vehicle along the learned route.

2. The vehicular control system of claim 1, wherein the vehicle control increases the confidence level of the learned route by predicting driver behavior for an upcoming segment of the route and comparing the prediction to actual driver behavior of the driver during driving by the driver of the vehicle along the segment of the route.

3. The vehicular control system of claim 2, wherein the predicted driver behavior comprises (i) steering of the vehicle by the driver, (ii) acceleration of the vehicle by the driver and (iii) braking of the vehicle by the driver.

4. The vehicular control system of claim 2, wherein the upcoming segment of the route comprises a route segment along the route having a set distance along the route from the vehicle location at the beginning of the upcoming segment of the route.

5. The vehicular control system of claim 2, wherein the segment of the route comprises a route segment along the route that is traveled over a set amount of time from the time at the beginning of the upcoming segment of the route.

6. The vehicular control system of claim 1, wherein, while the vehicle control is operating to at least semi-autonomously control the vehicle to drive the vehicle along the learned route, and responsive to determination by the vehicle control of a deviation from learned features along the learned route, the at least semi-autonomous control of the vehicle is replaced by handing over control of the vehicle to the driver of the vehicle.

7. The vehicular control system of claim 6, wherein, while the vehicle control is at least semi-autonomously controlling the vehicle to drive the vehicle along the learned route, and responsive to the determination of the deviation from the learned features along the learned route, the vehicle control generates an alert to have the driver of the vehicle take over driving of the vehicle.

8. The vehicular control system of claim 7, wherein the vehicle control, responsive to a determination that the driver of the vehicle has not taken over driving of the vehicle after the alert is generated, controls driving of the vehicle to slow or stop the vehicle.

9. The vehicular control system of claim 6, wherein the vehicle control determines the deviation from the learned features along the learned route via processing of data captured by one or more sensors of the vehicle, the sensors comprising the camera.

10. The vehicular control system of claim 9, wherein the vehicle control determines the deviation by determining a pedestrian is present along the learned route.

11. The vehicular control system of claim 1, wherein the vehicle control semi-autonomously controls the vehicle to drive the vehicle along the learned route responsive to a user input when the vehicle is at a location along the learned route.

12. The vehicular control system of claim 11, wherein the vehicle control provides an alert to the driver of the vehicle as the vehicle approaches an end of the learned route.

13. The vehicular control system of claim 12, wherein the alert comprises a countdown as the vehicle approaches the end of the learned route.

14. The vehicular control system of claim 1, wherein the vehicle control does not include interfered driving segments when learning the route driven by the vehicle during multiple repetitive drives of the route by the vehicle.

15. A vehicular control system, the vehicular control system comprising:
- a vehicle control comprising circuitry and associated software, wherein the vehicle control is operable to control driving of a vehicle equipped with the vehicular control system;
- an acceleration sensor disposed at the vehicle;
- a camera disposed at an in-cabin side of a windshield of the vehicle and viewing forward of the vehicle through the windshield, the camera capturing image data;
- wherein the circuitry of the vehicle control comprises an image processor for processing the image data captured by the camera;
- wherein the image data captured by the camera while the vehicle is driven along a route by a driver of the vehicle is processed at the image processor to detect traffic viewed by the camera while the vehicle is driven along the route by the driver of the vehicle;
- wherein the image data captured by the camera while the vehicle is driven along the route by the driver of the vehicle is processed at the image processor to detect road topography of a road currently traveled by the vehicle while the vehicle is driven along the route by the driver of the vehicle;
- wherein the vehicle control, responsive at least in part to (i) detecting traffic while the vehicle is driven along the route by the driver of the vehicle, (ii) detecting road topography while the vehicle is driven along the route by the driver of the vehicle, and (iii) determining acceleration of the vehicle via the acceleration sensor while the vehicle is driven along the route by the driver of the vehicle, learns the route driven by the driver of the vehicle during multiple repetitive drives of the route by the driver of the vehicle;
- wherein the vehicle control, when learning the route driven by the vehicle during multiple repetitive drives of the route by the vehicle, determines whether a driving segment of the route is a free ride driving segment or an interfered driving segment, and wherein the free ride driving segment comprises a driving segment where no vehicles are within a threshold distance in front of the vehicle, and wherein the interfered driving segment comprises a driving segment where another vehicle is within the threshold distance in front of the vehicle;
- wherein the vehicle control, when learning the route driven by the vehicle during multiple repetitive drives of the route by the vehicle, assigns a greater learning weight to free ride driving segments relative to interfered driving segments;
- wherein, during the multiple repetitive drives of the route by the vehicle to learn the route, a confidence level for the learned route is increased, and wherein the confidence level represents a likelihood the vehicle control is capable of at least semi-autonomously controlling the vehicle along the learned route;
- wherein the vehicle control increases the confidence level of the learned route by predicting driver behavior for an upcoming segment of the route and comparing the prediction to actual driver behavior of the driver during driving by the driver of the vehicle along the segment of the route;
- wherein the predicted driver behavior comprises (i) steering of the vehicle by the driver, (ii) acceleration of the vehicle by the driver and (iii) braking of the vehicle by the driver;
- wherein the upcoming segment of the route comprises one selected from the group consisting of (i) a set distance along the route from the vehicle location at the beginning of the upcoming segment of the route and (ii) a set amount of time from the time at the beginning of the upcoming segment of the route;
- wherein the vehicle control determines that the confidence level of the learned route fails to exceed a threshold value;
- wherein, responsive to determining that the confidence level of the learned route fails to exceed the threshold value, the vehicle control disables at least semi-autonomous control of the vehicle along the learned route;
- wherein, after the vehicle control disables at least semi-autonomous control of the vehicle along the learned route, the vehicle control determines that the confidence level of the learned route exceeds the threshold value;
- wherein, responsive to determining that the confidence level of the learned route exceeds the threshold value, the vehicle control enables at least semi-autonomous control of the vehicle along the learned route; and
- wherein, responsive at least in part to determining that the vehicle is traveling along the learned route when the at least semi-autonomous control of the vehicle along the learned route is enabled, the vehicle control at least semi-autonomously controls the vehicle along the learned route.

16. The vehicular control system of claim 15, wherein, while the vehicle control is operating to at least semi-autonomously control the vehicle to drive the vehicle along the learned route, and responsive to determination by the vehicle control of a deviation from learned features along the learned route, the at least semi-autonomous control of the vehicle is replaced by handing over control of the vehicle to the driver.

17. A method for vehicular control, the method comprising:
- equipping a vehicle with a vehicular control system comprising a vehicle control comprising circuitry and associated software, an acceleration sensor disposed at the vehicle, and a camera disposed an in-cabin side of a windshield of the vehicle and viewing forward of the vehicle through the windshield, wherein the circuitry of the vehicle control comprises an image processor for processing image data captured by the camera;
- capturing the image data by the camera while the vehicle is driven along a route by a driver of the vehicle;
- providing the image data captured by the camera to the vehicle control;
- processing, via the image processor of the vehicle control, the image data captured by the camera and provided to the vehicle control;
- detecting, by the vehicle control, based on processing the provided image data captured by the camera, traffic along the route driven by the driver of the vehicle;
- detecting, by the vehicle control, and based on processing the image data from the camera, road topography of a road currently traveled by the vehicle while the vehicle is driven along the route by the driver of the vehicle;
- determining, by the vehicle control, acceleration of the vehicle while the vehicle is driven along the route by the driver of the vehicle via the acceleration sensor;
- learning, by the vehicle control, the route driven by the driver of the vehicle during multiple repetitive drives of the route by the driver of the vehicle, based on (i) the detected traffic along the route, (ii) the detected road topography along the route and (iii) the determined acceleration of the vehicle along the route;

wherein the vehicle control, when learning the route driven by the vehicle during multiple repetitive drives of the route by the vehicle, determines whether a driving segment of the route is a free ride driving segment or an interfered driving segment, and wherein the free ride driving segment comprises a driving segment where no vehicles are within a threshold distance in front of the vehicle, and wherein the interfered driving segment comprises a driving segment where another vehicle is within the threshold distance in front of the vehicle;

wherein the vehicle control, when learning the route driven by the vehicle during multiple repetitive drives of the route by the vehicle, assigns a greater learning weight to free ride driving segments relative to interfered driving segments;

increasing, by the vehicle control, a confidence level for the learned route based on the multiple repetitive drives of the route by the driver, wherein the confidence level represents a likelihood the vehicle control is capable of at least semi-autonomously controlling the vehicle along the learned route;

determining, by the vehicle control, that the confidence level of the learned route fails to exceed a threshold value;

when the confidence level of the learned route fails to exceed the threshold value, disabling, by the vehicle control, at least semi-autonomous control of the vehicle along the learned route;

after disabling at least semi-autonomous control of the vehicle along the learned route, determining, by the vehicle control, that the confidence level of the learned route exceeds the threshold value;

when the confidence level exceeds the threshold value, enabling, by the vehicle control, at least semi-autonomous control of the vehicle along the learned route; and when the vehicle is travelling along the learned route and when the at least semi-autonomous control of the vehicle along the learned route is enabled, at least semi-autonomously controlling, by the vehicle control, the vehicle along the learned route.

18. The method of claim 17, wherein increasing the confidence level for the learned route comprises predicting driver behavior for an upcoming segment of the route and comparing the prediction to actual driver behavior of the driver during driving by the driver of the vehicle along the segment of the route.

19. The method of claim 18, wherein the predicted driver behavior comprises (i) steering of the vehicle by the driver, (ii) acceleration of the vehicle by the driver and (iii) braking of the vehicle by the driver.

20. The method of claim 18, wherein the upcoming segment of the route comprises a route segment along the route having a set distance along the route from the vehicle location at the beginning of the upcoming segment of the route.

21. The method of claim 18, wherein the segment of the route comprises a route segment along the route that is traveled over a set amount of time from the time at the beginning of the upcoming segment of the route.

22. The vehicular control system of claim 15, wherein the vehicle control does not include interfered driving segments when learning the route driven by the vehicle during multiple repetitive drives of the route by the vehicle.

23. The method of claim 17, wherein, the vehicle control does not include interfered driving segments when learning the route driven by the vehicle during multiple repetitive drives of the route by the vehicle.

\* \* \* \* \*